United States Patent [19]

Temple

[11] 4,240,944
[45] Dec. 23, 1980

[54] EMULSION COMPOSITION AND METHOD FOR USE IN TREATING GLASS FIBERS

[75] Inventor: Chester S. Temple, McKees Rocks, Pa.

[73] Assignee: PPG Industries, Inc., Pittsburgh, Pa.

[21] Appl. No.: 11,454

[22] Filed: Feb. 12, 1979

[51] Int. Cl.$^3$ .............................................. C08L 23/12
[52] U.S. Cl. ............................ 260/29.6 NR; 428/391; 428/392
[58] Field of Search ............... 260/29.6 XA, 29.6 NR, 260/29.6 WB; 428/391, 392

[56] References Cited

U.S. PATENT DOCUMENTS

| 3,073,790 | 1/1963 | Bosoni | 260/29.6 XA |
|---|---|---|---|
| 3,267,060 | 8/1966 | Putnam | 260/29.6 |
| 3,416,990 | 12/1968 | Robinson | 161/93 |
| 3,434,993 | 3/1969 | Mirabile | 260/29.6 XA |
| 3,437,550 | 4/1969 | Paul | 161/93 |
| 3,480,580 | 11/1969 | Joyner | 260/29.6 XA |
| 3,483,276 | 12/1969 | Mahlman | 260/897 |
| 3,644,141 | 2/1972 | Preston | 260/29.6 R |
| 3,655,353 | 4/1972 | Nalley | 260/29.6 XA |
| 3,692,877 | 9/1972 | Shibahara | 260/29.6 XA |
| 3,755,219 | 8/1973 | Bergomi | 260/8 |
| 3,769,151 | 10/1973 | Knutson | 260/29.6 WB |
| 3,814,715 | 6/1974 | Nalley | 260/29.6 XA |
| 3,849,148 | 11/1974 | Temple | 106/287.15 |
| 3,912,681 | 10/1975 | Dickson | 260/29.6 H |
| 3,936,415 | 2/1976 | Coakley | 260/42.15 |

Primary Examiner—Paul R. Michl
Attorney, Agent, or Firm—Kenneth J. Stachel

[57] ABSTRACT

A binder composition and method for using same in sizing compositions for treating glass fibers is provided. The binder composition is an aqueous emulsion containing isotactic carboxylated polypropylene along with amorphous carboxylated polypropylene, base, and surfactant. The isotactic carboxylated polypropylene is incorporated in the emulsion by a method of co-emulsification of the isotactic and amorphous carboxylated polypropylene in a ratio of 1:1 to 1:4 parts by weight along with the base and surfactant. Water is added to the co-emulsified blend to obtain the emulsion with the desired solids content.

7 Claims, No Drawings

EMULSION COMPOSITION AND METHOD FOR USE IN TREATING GLASS FIBERS

BACKGROUND OF THE INVENTION

The present invention relates to a composition and method of making same for use in a size composition for treating glass fibers during or after forming with an aqueous size composition which prepares the glass fibers for bonding to polyolefin resin in the reinforcement of specific polyolefin materials.

Glass fibers have many uses one of which is for reinforcement material in the form of continuous strands, chopped strands, mats, roving or woven cloth for polyolefins. The glass fiber reinforced polyolefins have better dimensional stability, tensile strength, flexural modulus, flexural strength, impact resistance and creep resistance than unreinforced polyolefin material.

The glass fibers for use as reinforcement material are made by drawing at a high rate of speed a multitude of molten glass streams that flow from small openings in a bushing. The fibers are treated with a size composition that performs several functions. It protects the fibers during gathering into a strand or strands and during further processing. It also has the capability to couple or to adhere the glass fibers with the polyolefin material in which the glass fibers are to be used as reinforcement. In addition, the size composition makes the surface of the glass fibers compatible with the polyolefin material. The size composition performs these functions by containing the following components usually in an aqueous dispersion or an emulsion: a glass fiber lubricant, a coupling agent, and a film forming synthetic resinous binder. After the glass fibers are treated with the size composition, they are gathered together and wrapped on a tube or spool by a winder that usually also provides the pulling force to draw the fibers to produce a forming package. The glass fibers are removed from the forming package to produce the fiber glass products used to reinforce polyolefin material.

The resinous binder or finishing material that is a component of the size composition used to treat glass fibers to be used to reinforce polyolefin material is usually an aqueous pololefin emulsion. This emulsion can be a polypropylene emulsion, a polypropylene-polyethylene emulsion, or carboxylated polypropylene emulsion, or carboxylated polypropylene-polyethylene emulsion. Illustrative examples of such emulsions include the following U.S. Pat. Nos. 3,655,353; 3,849,148; 3,882,068; 3,814,715 (Nalley et al). As taught in U.S. Pat. No. 3,655,353 (Nalley et al) the emulsion is prepared by melting polypropylene (and polyethylene when used) and adding suitable emulsifying agents with stirring and then adding water until the water and oil emulsion invert to an oil in water emulsion. The emulsions are made to contain about 20 to 40 percent by weight of solids (non-aqueous ingredients) based upon the weight of emulsion. Suitable emulsifying agents include Triton X-100, Igepal CO-630 and Tergitol. The polypropylene employed in the size has an average molecular weight in the range of about 5,300 to 7,300 and a ring and ball softening point of 150° to 175° C., and a density of 0.85 to 1 gram per cubic centimeter, and a penetration hardness (100 grams/5 seconds/22° C. [72° F.]) in tenths of a millimeter of 0.01 maximum. Several polypropylene or polypropylene/polyethylene emulsions are commercially available, such as RL 3974 and Abraze-ade emulsions both of which are marketed by Proctor Chemical Corporation. These emulsions are based on the use of the amorphous polypropylene, since the amorphous polypropylene can be easily converted into an aqueous emulsion.

Polymers of the alpha-olefin monomer type such as polypropylene, exist in several stereosiomeric polymeric forms. When the polymer is in the plainer zig-zag form there are three possible configurational arrangements for the substitute groups. The isotactic form is where the substituents appear always on the same side of the main chain and the syndiotactic form is where the substituents are located on alternate sides of the main chain. These forms are stereo-regular structures and exhibit strong tendancies to crystallize and as such, are essentially linear, head-to-tail polymers that are higher melting than amorphous type polymers. The atactic or amorphous polymer form is where substitution is completely random. The atactic polymers are also linear, head-to-tail polymers that are universally amorphous. The term "polypropylene polymers" is inclusive of all polymers derived from propylene whether essentially amorphous or essentially crystalline, including copolymers, inclusive of block co-polymers, of propylene with one or more other monomers.

Polyolefins that are to be reinforced with glass fibers have been developed that are propylene acid compounds and that are blends of isotactic and amorphous polypropylene. Illustrative examples of the propylene acid compounds or acid-modified propylene polymers are U.S. Pat. Nos. 3,416,990 (Robinson); and 3,437,550 (Paul) and an article published by the Society of Automative Engineers entitled Properties of Reinforced Propylene/Acid Compounds by R. A. VanBrederode, R. A. Steinkamp, K. W. Bartz, K. L. Trachte and D. G. Stenmark No. 740292, February-March, 1974. Illustrative examples of the blends of isotactic and amorphous polypropylenes are presented in U.S. Pat. Nos. 3,073,790 and 3,483,276. In U.S. Pat. No. 3,073,790 (Bosoni) an aqueous dispersion of the isotactic polypropylene of any desired concentration even up to a concentration of 100 percent is made by stirring the polymer in the form of particles having a size between 0.1 and 20 microns into water at room temperature. In U.S. Pat. No. 3,483,276 (Mahlman) blends of propylene polymer and maleic anhydride-modified propylene polymers are prepared. The stereo-isomers either isotactic polypropylene or amorphous polypropylene can be blended with the maleic anhydride-modified propylene polymers. The modified polymers can be prepared by reacting maleic anhydride with any solid propylene polymer either crystalline or amorphous. When the blend of polypropylene and maleicanhydride modified polypropylene is used to coat metal, it can be applied either as an organosol or as a solution. The organosol is used in cases where either the modified or unmodified polymer is crystalline and thus insoluble at ordinary temperatures. If both polymers are amorphous, the solution method is employed.

Since the size composition containing polypropylene emulsion is an aqueous system, the use of organosol or even water dispersions of micronized polypropylene powder would not be recommended. Organic solvents are expensive, and create an explosion hazard if used in an area adjacent to high temperature and high voltage equipment. Additionally, micronized polyolefin dispersions tend to cream out (component of the dispersion separates out and rises to the surface) making the dispersion unusable. The use of such unstable water dispersions with an aqueous size system would provide application and process problems during fiber glass production. For these reasons it is desired to use a polyolefin binder material or finishing material as an aqueous emulsion. Because of the difficulties of obtaining an emulsion with isotactic polypropylene, the type of polypropylene typically used in commercial size compositions as discussed above was the amorphous polypropylene. Recently it has been suggested to use the isotactic polypropylene in the size composition U.S. Pat. No. 3,644,141 (Preston) in order to form the polypropylene emulsion, wherein the polypropylene was the isotactic polypropylene; and wherein the emulsion was prepared by first combining the polyolefin and water with an organo-silane and thereafter incorporating the combination into a water dispersible polyester resin. The water dispersible polyester resin particles acted as a carrier for the polyolefin organo silane material.

Since the polyolefin to be reinforced with glass fibers can be a blend of isotactic and amorphous polypropylene, there is a need to provide a better binder composition for use in the size composition for coating glass fibers to be used as reinforcement for blended or unblended polypropylenes. There is also a continuing need for improved binder composition for use in a size composition for application to glass fibers that are to be used as reinforcement in polyolefin materials. There is also a need in the technology of binder compositions to have a facile and safe aqueous emulsion of a binder composition which contains isotactic polypropylene to be incororated into size compositions for treating glass fibers to be used as reinforcement in polyolefins.

SUMMARY OF THE INVENTION

It is an object of the present invention to provide a binder composition that is an aqueous emulsion containing isotactic carboxylated polypropylene for use in a size composition that is applied to glass fibers that are to be used as reinforcement material for polyolefins and polystyrenics.

It is an additional object of the present invention to provide a binder composition that is an aqueous emulsion for use in a size composition for application to glass fibers wherein the binder composition is non-flammable, and permits better coating of the size composition to the glass fibers.

It is a further object of the present invention to provide an aqueous emulsion containing isotactic carboxylated polypropylene useful as a binder composition in a size composition for application to glass fibers wherein the aqueous emulsion containing the isotactic carboxylated polypropylene is prepared without the use of a polyester resin carrier or organic solvent.

It is a further object of the present invention to provide a binder composition that is an aqueous emulsion containing isotactic carboxylated polypropylene that is relatively self-stabilizing, thereby, reducing the need of having present in the binder composition additional stabilizing agents like maleic acid.

It is another additional object of the present invention to provide a binder composition that is an aqueous emulsion for use in a size composition for treating glass fibers that are to be used as reinforcement material for a polyolefin matrix, which is a blend of isotactic and amorphous polypropylene, wherein the binder composition has better compatibility with the blended isotactic and amorphous polypropylene matrix.

It is another further object of the present invention to provide a binder composition that is an aqueous emulsion for use in a size composition for application to glass fibers wherein the binder composition has excellent physical properties of flexural and tensile strength.

It is another further additional object of this invention to provide a size composition for application to glass fibers that contains an improved binder composition that permits increased resistance to filamentation of the treated glass fibers and reduces the amount of size composition needed to treat the glass fibers without any substantial reduction in properties.

It is an additional, further object of the present invention to provide a method for preparing an aqueous, emulsion, binder composition containing isotactic carboxylated polypropylene for use in a size composition for application to glass fibers that are to be used as reinforcement for polyolefins.

These and other objects of the present invention are generally accomplished by the surprising discovery that a binder composition containing isotactic carboxylated polypropylene can be prepared as an aqueous emulsion by co-emulsification of isotactic carboxylated polypropylene and amorphous carboxylated polypropylene. The binder composition of the present invention that is an aqueous emulsion can be used in a size composition for treating glass fibers and is comprised of isotactic carboxylated polypropylene co-emulsified with amorphous carboxylated polypropylene in a ratio of the isotactic to amorphous polypropylene in the range of about 1 to about 1 to about 1 to about 4 parts by weight.

The aqueous emulsion of the carboxylated isotactic polypropylene is prepared by melting the isotactic carboxylated polypropylene with the amorphous carboxylated polypropylene (and carboxylated polyethylene when used) and with base and surfactants at sufficient melting conditions. The emulsion is made to generally contain about 20 to about 40 percent by weight of solids (non-aqueous) ingredients based upon the weight of the emulsion. The aqueous emulsion of isotactic carboxylated polypropylene and amorphous carboxylated polypropylene can be incorporated in any aqueous size compositions known to those skilled in the art to be compatible with carboxylated polypropylenes. The aqueous emulsion binder composition can be combined with coupling agents, lubricants, film-formers, softeners, and other conventional additives to yield a size composition that can be applied to glass fibers in a facile manner to improve the treated glass fibers ability to reinforce polyolefin articles.

DETAILED DESCRIPTION OF THE INVENTION

In the present invention the isotactic and amorphous carboxylated polypropylene resin can be prepared by any method known to those skilled in the art. Acid modification of propylene polymers either amorphous or crystalline in type can be effected by the method explained in the U.S. Pat. No. 3,416,990 (Robinson), U.S. Pat. Nos. 3,437,550 (Paul) or 3,483,276 (Mahlman). This method generally involves modifying polypropylene with an ethylenically substituted carboxylic and polycarboxylic acids or an anhydride, amide or lower alkyl ester thereof which has its ethylenic unsaturation on a carbon atom in a position alpha to at least one carboxyl group or potential carboxyl group. Examples of such acids and anhydrides include maleic acid, fumaric acid, itaconic acid, citraconic acid, acrylic acid, methacrylic acid, crotonic acid, isocrotonic acid, mesaconic acid, engelic acid, maleic anhydride, itaconic anhydride and citraconic anhydride. The preferred modifier is maleic anhydride to produce the maleonated isotactic and amorphous polypropylene. An example of a crystalline carboxylated polypropylene polymer that can be used in the binder composition of the present invention is Hercoprime ® G type resin available from Hercules, Inc., Bloomington, Delaware 19899. An example of the carboxylated amorphous polypropylene polymer that can be used in the binder composition of the present invention is commercially available as Epolene ® E-43 available from Tennessee Eastman Company, Tennessee.

The ratio of the isotactic carboxylated polypropylene to the amorphous carboxylated polypropylene polymer can be in the range of about 1–about 1 to about 1–about 4 respectively. If larger amounts of the isotactic polypropylene are used the efficiency of converting all of the isotactic carboxylated polypropylene into a stable mix decreases with the postassium or sodium hydroxide/surfactant system. If larger amounts of amorphous carboxylated polypropylene polymer are used usually no adverse effects occur.

In addition to the amorphous carboxylated polypropylene present in the blend of isotactic carboxylated polypropylene and amorphous carboxylated polypropylene, an amount of carboxylated polyethylene may be used in addition to the amount of amorphous carboxylated polypropylene. The amount of carboxylated polyethylene polymer used should not exceed about 75 weight percent by weight of the olefin content in the blend.

The base present in the emulsion is added to neutralize the polymers. The base is any compound or solution or mixture thereof that when added in reasonable amounts accomplishes this purpose. Non-limiting examples of bases that can be used include alkali metal hydroxides, alkaline earth metal hydroxides, alkali metal salt of a strong base and weak acid and organic bases. For the purpose of this invention, alkali metal refers to sodium, potassium, lithium and ammonium compounds. Also, alkaline earth metal refers to calcium, magnesium and barium. Also, organic bases include primary, secondary, tertiary aliphatic and aromatic amines, pyridine and pyrrole. The alkali metal salt of a strong base and weak acid refers to salts that yield a basic solution when in water. Non-exclusive examples of these compounds include alkali metal borates, citrates, carbonates, and bicarbonates. Non-limiting examples of the above compounds include: ammonium hydroxide, sodium hydroxide, potassium hydroxide, lithium hydroxide, calcium hydroxide, magnesium hydroxide, barium hydroxide; sodium tetra borate decahydrate, or pentahydrate, sodium meta borate tetrahydrate, sodium tetraborate, sodium carbonate, hydrates of sodium carbonate, sodium citrate and hydrates thereof, and similar compounds for the other alkali metals of potassium, lithium and ammonium; pyridine, pyrrol, 2-aminomethylpropanol benzylamine, n-butylamine, t-butyl-amine, cyclohexylamine, n-decylamine, diethylamine, diisobutylamine, dimethyl-amine, ethylamine, ethylenediamine, hexamethylene diamine, methylamine, 3-amenopentane, 3-amino-3 methylpentone, piperazine, 1,3-diamino-propane, and propylamine.

The surfactant that is present in the emulsion emulsifies the neutralized polymer mixture. The surfactant may be any compound that is nonionic, cationic or anionic and accomplishes this purpose. Non-exclusive examples of surfactants include phenoxypoly (ethyleneoxy) ethanol, phenoxy (ethyleneoxy) ethanol, octylphenoxypoly (ethyleneoxy) ethanol, nonylphenoxypoly (ethyleneoxy) ethanol and other ethoxylated alkyl phenols and other surfactants known to those skilled in the art of sizing chemistry for glass fibers. The amount of surfactant used are those amounts that are usually used by those skilled in the art.

The method of co-emulsifying the isotactic carboxylated polypropylene polymer and amorphous carboxylated polypropylene polymer and carboxylated polyethylene, if any, generally includes melting the proper amounts of isotactic carboxylated polypropylene with amorphous carboxylated polypropylene and with any carboxylated polyethylene, if any; and with base and surfactants. The preferred method of co-emulsification includes mixing the desired amounts of the two or alternatively three polymers at a high temperature in the range generally of about 106° C. to about 185° C. and most preferably 170° C. to 175° C. and at super atmospheric pressures generally in the range of about 80 to about 140 psig (5.4–9.5) atmospheres and preferably in the range of about 100 to about 120 psig (6.8–8.2 atmospheres). The mixing is performed in the presence of a base preferably selected from the group consisting of alkali metal hydroxides, borax, or organic bases, such as, 2-aminomethylpropanol and suitable surfactants. The base is added to neutralize the polymer after which the surfactant of the desired charge i.e. cationic, anionic, or nonionic is used to emulsify the neutralized polymer mixture. The range of base hydroxides usually used should preferably be sufficient to provide a residual content of hydroxides ranging from about 16 to about 24 mg of hydroxide (based on KOH) per gram of emulsion. The most preferred hydroxide is potassium hydroxide. The amount of surfactant used is generally in the range of about 2 to about 12 weight percent and preferably about 6 to about 9 weight percent. Suitable surfactants preferably include products, such as, Triton X-100, Igepal C0630, and the like. After the mixture reacts and mixes well, quenching water is added to quickly cool the mixture to provide optimum product quality. The emulsion tends toward being colloidal and translucent. The emulsion is usually made to contain about 20 to about 40 percent solids by weight.

The binder composition of the present invention containing the co-emulsion of isotactic carboxylated polypropylene polymer and amorphous carboxylated polypropylene polymer can be used in any of the conventional size compositions for treating glass fibers that are to be used as reinforcement for polyolefin material. Conventional aqueous size compositions used to contact and coat glass fiber strand is composed of a coupling agent, a softening agent (plasticizer), a surfactant, a lubricant and a film-former. The use of a stabilizer such as maleic acid is not necessary since the binder composition of the present invention has a substantial degree of self-stabilization.

The coupling agent may be any interfacial boundary area adhesive compound which acts to unite the surface of the fibers with the polyolefin polymer. Among typical coupling agents for uniting glass fiber and polymers are metal salts such as basic chromium chloride, basic chromium sulfide having a trivalent metal ion selected from the group consisting of chromium, cobalt, nickel, copper, and lead having at least one hydroxyl group attached to the metal and at least one anion of a strong mineral acid attached to the metal; Werner complexes in which the trivalent nuclear atom such as chromium is coordinated with an organic acid such as methacrylic acid, for instance, methacrylic complex of chromic chloride, and other coupling agents, having vinyl alkyl, amino, epoxy, mercapto, thioalkyl, thioalkaryl and phenol groups. Suitable for utilization in the instant invention are coupling agents from the silane and siloxane groups. Typical of such coupling agents are the hydroalyzable vinyl, allyl, beta-chloropropyl, phenyl, thioalkyl, thio-alkaryl, amino-alkyl, methacrylato, epoxy, and mercapto silanes their hydrolysis products and polymers of hydrolysis products and mixtures of any of these. A preferred coupling agent is gamma-aminopropyltriethoxysilane. This material has been found to provide a very good coupling between the glass fiber strands and polyolefin polymers at low concentrations and with good stability.

In a typical size composition, a stabilizer is generally used which acts as a secondary coupler to improve the stability of the sizing system, and to assist in cross-linking, and to improve the coupling agent and resin to fiber interface, and, in addition, to assist the action of the silylated coupler. Typical stabilizers include the ethylenically unsaturated carboxylic acids or anhydrides such as maleic acid. Since the binder composition of the present invention has the co-emulsified blend of isotactic carboxylated polypropylene and amorphous carboxylated polypropylene polymers, the addition of a stabilizer is not necessary since the blend has a substantial degree of autostabilization.

In addition to the binder composition of the present invention and the coupling agent, the size composition can also contain a textile lubricant. The lubricant is preferably cationic or non-ionic. Various conventional glass fiber textile lubricants can be used as shown in U.S. Pat. No. 3,814,715 which is hereby incorporated by reference. Also another glass fiber lubricant that can be used in the size composition is an alkyl imidazoline derivative as those imidazoline derivatives mentioned in U.S. Pat. No. 3,814,715. Also, these lubricants may be used in combination with or replaced by a quaternary pyridinium compound as shown in U.S. Pat. No. 3,814,715 hereby incorporated by reference.

The size may also contain a wetting agent that is cationic or non-ionic that may also serve as an additional lubricant. Any material which is conventionally known by those skilled in the art to reduce the surface tension of the size composition so that it is about 25 to 35 dynes per square centimeter can be used. Such materials are well known to those skilled in the art as is shown in U.S. Pat. No. 3,814,715.

Additional additives which are typically added to a size composition for application to glass fibers may also be used with the size composition containing the improved binder composition of the present invention as long as there are no compatibility problems. Examples of such additives include softeners and surfactants and the like. The softener may be any material that softens the glass fiber strand, modifies drape, decreases the scroopiness of the glass fibers and contributes lubricity to the strand. Preferred softeners are the polyethylene imine derivatives. A surfactant would act as a wetting agent, emulsifier, and detergent to maintain the size composition as an emulsion and prevent build up of solids on an application apparatus. Among suitable surfactants are condensates formed by condensing propylene oxide and propylene glycol such as those disclosed in U.S. Pat. No. 2,674,619. The additives may be used in the usual amounts that have been used in conventional size compositons.

The size composition containing the binder composition of the present invention may also contain film formers. The film former is a polymer which can provide strand integrity to aid in the processability of the glass fiber strand during manufacture and/or during its subsequent handling or use. The polymer film former can be a homopolmer or mixture of homopolymers that during the mixing, storage and use of the mixture will not crosslink in the sizing with any other sizing constituent which would reduce its stability. Examples of such filmforming polymers include epoxies, polyvinylacetates, polyesters, polyurethanes and acrylics. An example of a polyvinylacetate film-former is vinyl acetate homopolymer. The binder stable film formers such as the polyvinylacetate homopolymers are utilized in amounts which will impart the desired degree of handling properties to the sized glass fiber strand. A normal range of film forming polymer to use would be between about 20 and about 60 percent by weight of the solids in the sizing composition. A preferred amount of a binder stable polymers is between about 35 and about 40 percent by weight to give optimum handability. Also pot-life stable self-reactive cross linked polymers can be used as film formers in the size composition containing an improved binder composition of the present invention. The self-reactive, cross-linked polymers may be any polymer or homopolymer or copolymer capable of becoming cured or crosslinked without addition of further materials in the conditions encountered during the drying of the sized glass fiber strands. Typical examples of such polymer film formers are vinyl acetates, epoxies, polyesters, polyurethanes and acrylic polymers and co-reaction products thereof. A preferred polymer is one based on a polyurethane latex capable of maintaining excellent binder shelf life while imparting excellent handling properties to the sized fiber glass strand, when the latex is applied and cured to glass fiber strands.

The total solids (non-aqueous content) of the size composition can range from about 2 to about 20 percent by weight of the size, preferably about 3 to about 10 percent by weight of the size. In all events the amounts of the various ingredients should not exceed that amount that will cause the viscosity of the solution to be greater than about 100 centipoise at 20° C. Solutions having viscosities greater than 100 centipoise are very difficult to apply to glass fiber strands during their formation with standard type applicator equipment without breaking the continuity of the strand. It is preferred that the viscosity of the size composition be between 1 and 20 centipoise at 20° C. for best results.

The binder composition of the present invention is used in the size composition in an amount of about 2 to about 15 percent by weight of the size composition. The coupling agent is used in an amount from to about 0.1 to 2.0 percent by weight of the size composition, and the amount of textile lubricant is in the range of about 0.2 to 4 percent by weight of the size composition. When the binder contains polyethylene the solids content of the binder is composed of about 25 to 99.5 percent by weight of the blend of isotactic carboxylated polypropylene and the amorphous carboxylated polypropylene and about 0.5 to 75 percent by weight of polyethylene. As greater percentages of polyethylene are employed in the emulsion it is preferred that the softening point of the polyethylene be higher in order to obtain good adhesion in glass fiber reinforced glass polymers.

Any glass suitable for reinforcing and for drawing into fiber form may suitably be treated in accordance with the size composition or sizing having the binder composition of the present invention. Soda-lime glasses and borosilicate ("E" glasses) are particularly suited for this practice.

The glass fiber strand to be treated with the size composition containing the binder composition of the present invention may be typically produced according to the teachings of U.S. Pat. No. 2,133,238. The glass fiber strands are composed of a multitude of fine glass filaments which are formed by being drawn at a high rate of speed from molten cones of glass located at the tips of small orifices in a bushing. During the formation of the glass fibers, the filaments are coated with the size composition containing the binder composition of the present invention. Coating of the filaments takes place while they are moving at a speed in the order of 1,000 to 20,000 feet per minute. The coating is accomplished in the immediate vicinity of the hot bushings and the glass furnace in which the glass is melted. After coating, the glass fibers move a short distance onto a collecting means, whereupon they are subsequently dried to drive off residual moisture.

It is to be understood that the sized glass fibers may be formed and the size composition applied by the known methods of fiber formation and sizing application. Representative of a method of fiber formation and sizing application is the process illustrated in FIG. 2 of U.S. Pat. No. 3,849,148 which is hereby incorporated by reference. Glass fiber filament emerge from orifices of an electrically heated bushing. These fibers are attenuated and by means of a strand pulling device these filaments are gathered to form a strand of glass fiber which may comprise numerous individual fibers. The sizing is applied to the fibers by conventional size applicators such as a kiss-roll applicator or a belt applicator device. Details of a sizing applicator is shown in U.S. Pat. No. 2,728,972. The filaments after exiting the bushing are cooled by air or preferably water. The filaments are gathered into bundles by a gathering shoe and are then lead to a strand pulling device such as that illustrated in U.S. Pat. No. 3,292,013, as well as, in the above-referenced, patent U.S. Pat. No. 3,849,148. The glass fiber strand or strands, if the filaments exiting from the bushing have been separated into several strands, are then wound onto a forming tube on a collet rotating at approximately 7,500 rpm to produce a strand travel of approximately 12,000 to 15,000 feet per minute. The glass fiber strand forming packages are then dried. This generally is accomplished by baking the packages of glass fibers at a temperature and for a period of time sufficient to remove substantially all the water. Generally a curing time for the instant size composition is about 11 hours at 270° F. (132° C.).

The glass fiber strand sized with the size composition having the binder composition of the present invention can be further processed in several ways to be used as reinforcement for polyolefin materials.

One approach involves forming the glass fibers and treating the glass fibers with the size composition in the aforementioned methods. The filaments are gathered together to form one or more strands. The strand or strands are passed through a free wheeling feed roll which aligns the strands for the subsequent cutting action. The feed roll is in contact with a cot roll that together provide the attenuation necessary to form the fibers. The strand or strands are then passed between the cot roll and cutting blades. The chopped strand then falls onto a conveyor as a wet chopped strand. The wet chopped strand is conveyed to a heater to reduce the moisture of the strand to produce dried chopped strand for use as reinforcement.

When forming packages are desired for use in forming a polyolefin composite article, a group of the forming packages are arranged so that the strands may be drawn from the packages and laid down to form a mat of fibers such as disclosed in U.S. Pat. No. 3,883,333 or U.S. Pat. No. 3,664,909. The mat is then needled and combined or impregnated with polyolefin resin or laminated with polyolefin sheets to form reinforced polyolefin articles which are heated to a temperature in the range of 400° F. to about 430° F. at a pressure of about 9,250 lbs. per square inch for about 5 to about 20 minutes to bind the sized glass fibers coated with the size composition containing the binder composition of the present invention to the polyolefin.

Another approach for forming a mat of fibers for use as reinforcement material is disclosed in U.S. Pat. No. 3,684,645 (Temple et al) hereby incorporated herein. This method involves extending a continuous layer of a molten thermoplastic resin (polyolefin material) containing short sized glass fibers onto a chopped strand mat or continuous strand swirl mat. Heat and pressure are applied simultaneously to unite the resin and the mat to produce continuous sheets of the glass fiber reinforced thermoplastic or polyolefinic sheet.

Glass fiber strands coated with size composition containing the binder composition of the present invention can be used in reinforcing any polyolefin material in any manner known to those skilled in the art. However, the instant glass fibers find greater functionality in the reinforcement of polyolefinic resin polymer such as polyethylene, polypropylene, 2-methylpentene and the like. A preferred polyolefinic polymer for utilization with the instant size glass fiber strand is polypropylene since this polymer binds very well with the size composition which contains the binder composition of the present invention. In addition, the use of polypropylene is attractive from an economic standpoint. The ratio of polypropylene to glass may be selected in any ratio that imparts desired properties to the finished article. Generally a ratio of about 10 to about 50 weight percent glass is suitable. A preferred amount for polypropylene AZDEL ® sheet product is about 35 to about 45 percent by weight glass in the molded article to give a good balance of cost, properties, and structural strength. The preferred range of usage for injection molding application is about 20 to 30 percent by weight glass in the molded article.

The following examples are preferred embodiments of the instant invention. The parts and percentages are by weight unless otherwise indicated.

EXAMPLE I

A binder composition of an aqueous emulsion of a blend of isotactic carboxylated polypropylene and amorphous carboxylated polypropylene was prepared in the following manner. Two parts of amorphous maleonated polypropylene were blended with one part of isotactic maleonated polypropylene and with potassium hydroxide and a nonionic ethoxylated phenol surfactant available from GAF Corporation, New York, and with water to form an emulsion having 32% solids.

The emulsion was made by blending and melting the polypropylene together with diluted surfactant and potassium hydroxide at a high temperature of 170° C. to 175° C. and at a high pressure of 6.8 to 8.2 atmospheres. After the mixture reacted, the temperature of the reacted mix was quickly reduced by addition of dilution water to produce an emulsion containing 32 percent solids and having the following formulation:

60% maleonated amorphous polypropylene
30% maleonated isotactic polypropylene
8% nonionic ethoxylated phenol surfactant
2% potassium hydroxide The emulsion had a pH of 8.0 to 9.5, and was infinitely dilutable in water. Its appearance was a pearly amber emulsion with a total alkalinity in the range of 16–24 mg KOH/gm and with a particle size of 3 micron maximum.

This emulsion was combined with other components to yield a size formulation as follows:

| Components | Kg/300 Gal. |
|---|---|
| Gamma-Aminopropyltri ethoxysilone | 9.9 |
| Emulsion | 40. |
| polyurethane latex (film former, Rucothane 2010 Mfg. by Hooker Chemical Co.) | 60 |

EXAMPLE 2

A size composition made in a manner similar to that of Example 1 except it had 23 percent of the emulsion identical to that of Example 1 and a concomitant increase in the amount of film former.

EXAMPLE 3

A size composition made in a manner similar to that of Example 1 except it had 15 percent of the emulsion identical to that of Example 1 and a concomitant increase in the amount of polyurethane film former.

The size composition of Example 2 was used to treat glass fibers made in the aforedescribed process for producing chopped glass fiber strands. The strands were chopped in ¼″ lengths and direct dry in blend molded Pro-Fax 6323PM (12 melt flow) and Pro-Fax 6523PM (4 melt flow) polypropylene resins at temperatures of 450°, 500° and 500° F. (232° C.) (260° C.) (288° C.). All these resins are available from Hercules, Inc. The molded product using the size composition of Example 2 is designated "samples G". The following table shows data for these products that indicate the results of using the isotactic/amorphous blend emulsion in the size composition.

TABLE

| Mold Sample | %CS[1] | Flex Strength M Pa (psi) | Flex Modulus G Pa (×10 psi) | Tensile Strength M Pa (psi) | Resin |
|---|---|---|---|---|---|
| Commercial Standard | 21.6 | 84.1 (12200) | 3.80 (.551) | 50.3 (7300) | Pro-Fax 6323 PM (450° F.)(232° C.) |
| G-1 Example 2 | 20.8 | 86.2 (12500) | 4.16 (.603) | 52.4 (7600) | Pro-Fax 6323 PM (450° F.)(232° C.) |
| G-2 Example 2 | 19.6 | 80.7 (11700) | 4.01 (.582) | 51.7 (7500) | Pro-Fax 6323 PM (450° F.)(232° C.) |
| G-3 Example 2 | 19.3 | 77.9 (11300) | 3.98 (.577) | 50.3 (7300) | Pro-Fax 6323 PM (500° F.)(260° C.) |
| G-4 Example 2 | 21.6 | 83.4 (12100) | 4.04 (.586) | 49.6 (7200) | Pro-Fax 6323 PM (550° F.)(288° C.) |
| G-5 Example 2 | 21.3 | 88 (12800) | 4.53 (.657) | 55 (8000) | Pro-Fax 6523 PM (450° F.)(232° C.) |
| Commercial | 20.3 | 88 (12700) | 4.68 (.679) | 49 (7100) | Pro-Fax 6523 PM (450° F.)(232° C.) |
| G-6 Example 2 | 20.9 | 97 (14100) | 4.87 (.707) | 51 (8300) | Pro-Fax 6523 PM (500° F.)(260° C.) |
| Commercial | 20.1 | 90 (13000) | 5.23 (.758) | 46 (6600) | Pro-Fax 6523 PM (500° F.)(260° C.) |
| G-7 Example 2 | 20.0 | 99 (14400) | 4.88 (.708) | 58 (8400) | Pro-Fax 6523 PM (550° F.)(288° C.) |
| Commercial | 19.5 | 93 (13500) | 5.64 (.818) | 43 (6200) | Pro-Fax 6523 PM (550° F.)(260° C.) |

[1] - percent chopped strand

From the data in the table, the use of the size composition with the emulsion composition of the present invention produces a reinforced polypropylene article that is comparable to or slightly better than commercially available chopped strand products. This result is achieved without the use of carriers or stabilizing agents in preparing the emulsion composition.

The foregoing has described an emulsion composition and method of making same, and a size composition for treating glass fibers. The emulsion having a blend of isotactic carboxylated polyproplene and amorphous carboxylated polyproplene allows the emulsification to occur in a more facile manner without the use of carriers or stabilizing agents.

I claim:

1. A size composition for treating glass fibers comprising:
   (a) an aqueous emulsion of an isotactic carboxylated polypropylene and amorphous carboxylated polypropylene,
   (b) coupling agent,
   (c) a film former, and
   (d) lubricant.

2. A size composition of claim 1 wherein the film former is a multifunctional polyurethane polymer.

3. A size composition of claim 1 wherein the coupling agent is an amino silane.

4. A size composition of claim 1 wherein the film former is selected from the group consisting of homopolymers and copolymers of vinyl acetates, epoxies, polyesters, polyurethanes, acrylic polymers and coreaction products thereof.

5. A size composition of claim 1 wherein the total solids on a non-aqueous basis of the size composition can range from about 2 to about 20 percent by weight.

6. A size composition for treating glass fibers comprising in percent by weight of the aqueous size composition:
   (a) about 2 to about 15 percent of an aqueous emulsion of an isotactic carboxylated polypropylene and amorphous carboxylated polypropylene,
   (b) about 0.1 to about 2.0 percent of an amino silane coupling agent,
   (c) about 0.4 to about 12 percent of a film former selected from the group consisting of homopolymers and copolymers of epoxies, vinyl acetates, polyesters, polyurethanes and acrylic polymers, and
   (d) about 0.2 to about 4 percent of a lubricant.

7. The sizing composition of claim 6 wherein the aqueous emulsion has present about 25 to about 99.5 percent by weight of the blend of isotactic carboxylated polypropylene and amorphous carboxylated polypropylene and about 0.5 to about 75 percent by weight of polyethylene.

* * * * *